US011097576B2

(12) United States Patent
Lesesky et al.

(10) Patent No.: US 11,097,576 B2
(45) Date of Patent: Aug. 24, 2021

(54) WHEEL HUB MOUNTED VEHICLE DATA COMMUNICATIONS DEVICE INCORPORATING A SELF-GENERATING ELECTRICAL POWER SUPPLY (71) Applicant: ITIRE, LLC, Rock Hill, SC (US)

(72) Inventors: Alan Clyde Lesesky, Rock Hill, SC (US); Samuel Duke Drinkard, Gaston, SC (US)

(73) Assignee: ITIRE, LLC, Rock Hill, SC (US)

( * ) Notice: Subject to any disclaimer, the term of this patent is extended or adjusted under 35 U.S.C. 154(b) by 0 days.

(21) Appl. No.: 16/941,017

(22) Filed: Jul. 28, 2020

(65) Prior Publication Data
US 2020/0353779 A1    Nov. 12, 2020

Related U.S. Application Data (63) Continuation of application No. 16/096,089, filed as application No. PCT/US2017/029373 on Apr. 25, 2017, now Pat. No. 10,723,182.

(60) Provisional application No. 62/442,095, filed on Jan. 4, 2017, provisional application No. 62/396,509, filed on Sep. 19, 2016, provisional application No. 62/327,129, filed on Apr. 25, 2016.

(51) Int. Cl.
B60C 23/04    (2006.01)
G06F 7/00    (2006.01)
B60C 23/20    (2006.01)
G01S 19/13    (2010.01)
G06K 19/07    (2006.01)

(52) U.S. Cl.
CPC ........ *B60C 23/041* (2013.01); *B60C 23/0406* (2013.01); *B60C 23/0418* (2013.01); *B60C 23/0447* (2013.01); *B60C 23/20* (2013.01); *G01S 19/13* (2013.01); *G06F 7/00* (2013.01); *G06K 19/0723* (2013.01)

(58) Field of Classification Search
None
See application file for complete search history.

(56) References Cited

U.S. PATENT DOCUMENTS

| 6,742,386 | B1 | 6/2004 | Larson |
| 7,306,020 | B2 | 12/2007 | Beverly et al. |
| 2001/0052258 | A1 | 12/2001 | Ehrlich et al. |
| 2005/0253694 | A1 | 11/2005 | Kuznarowis |
| 2006/0231184 | A1 | 10/2006 | Beverly et al. |
| 2006/0249320 | A1 | 11/2006 | Carter |
| 2007/0246997 | A1 | 10/2007 | Jenkinson et al. |

(Continued)

FOREIGN PATENT DOCUMENTS

| WO | 2013157999 A1 | 10/2013 |
| WO | 2015138431 A2 | 9/2015 |
| WO | 2016040763 A2 | 3/2016 |

*Primary Examiner* — Thomas S McCormack
(74) *Attorney, Agent, or Firm* — Schwartz Law Firm, P.C.

(57) ABSTRACT

A wireless vehicle data communications device is adapted for mounting on a wheel hub assembly of a vehicle and incorporates a self-generating electrical power supply. The vehicle data communications device includes a housing, a microprocessor located inside the housing, a signal transmitting device, a signal receiving device, an electric generator, and an energy storage and supply medium. The housing is adapted to rotate simultaneously with the wheel hub assembly when the vehicle is in motion. Rotation of the housing relative to the components carrier induces an electric current.

18 Claims, 10 Drawing Sheets (56) References Cited

U.S. PATENT DOCUMENTS

| | | |
|---|---|---|
| 2008/0074250 A1 | 3/2008 | Tsai |
| 2008/0212334 A1 | 9/2008 | Hickman |
| 2009/0206703 A1 | 8/2009 | Reichenbach |
| 2010/0014303 A1 | 1/2010 | Wang |
| 2011/0036671 A1 | 2/2011 | McKay |
| 2013/0073140 A1 | 3/2013 | Dunst et al. |
| 2014/0070935 A1 | 3/2014 | Wang et al. |
| 2015/0239309 A1 | 8/2015 | Root |

WHEEL HUB MOUNTED VEHICLE DATA COMMUNICATIONS DEVICE INCORPORATING A SELF-GENERATING ELECTRICAL POWER SUPPLY

TECHNICAL FIELD AND BACKGROUND OF THE DISCLOSURE

The present disclosure relates broadly and generally a wheel hub mounted vehicle data communications device incorporating a self-generating electrical power supply, and method for generating electrical power.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a wireless vehicle data communications device adapted for mounting (directly or indirectly) on a wheel hub assembly of a vehicle and incorporating a self-generating electrical power supply. The exemplary vehicle data communications device comprises a housing, a microprocessor located inside the housing, a signal transmitting device, a signal receiving device, an electric generator, and an energy storage and supply medium. The housing is adapted to rotate simultaneously with the wheel hub assembly when the vehicle is in motion. The signal transmitting device is operatively connected to the microprocessor, and is capable of wirelessly transmitting data from the vehicle data communications device to a remote computer. The signal receiving device is operatively connected to the microprocessor, and is capable of wirelessly receiving data from a remote computer.

The exemplary electric generator comprises a plurality of wire coils and magnets. One of the wire coils and magnets is attached to an independently influenced components carrier, and the other of the wire coils and magnets is designed to rotate substantially simultaneously with the housing. The wire coils and magnets are arranged such that rotation of the housing relative to the components carrier generates a magnetic field and induces an electric current. The energy storage and supply medium is operatively connected to the generator for storing the electric current produced by the generator, and for supplying electrical power to components of the vehicle data communications device.

The term "operatively connected" is broadly defined herein to mean direct physical (wired), indirect physical, or wireless communication/connection between components.

The term "remote computer" refers broadly and generally to any general or specific purpose machine with processing logic capable of manipulating data according to a set of program instructions, and physically located outside of the present vehicle data communications device. For example, the remote computer may comprise a mobile computing device, such as a laptop computer, netbook, e-reader, tablet computer, mobile phone, smartphone, personal digital assistant, desktop, and others. Alternatively, the remote computer may comprise an electronic onboard recorder (EOBR), vehicle telematics, or other vehicle computing systems. The remote computer may also comprise a cloud server, dedicated server or physical server. A further exemplary remote computer is described in Applicant's prior United States patent application, U.S. Publication No. US2015/0029016A1, published on Jan. 29, 2015 and entitled "TIRE DATA COLLECTION AND COMMUNICATION DEVICE, MULTI-PURPOSE HANDHELD DATA COLLECTION AND COMMUNICATION TOOL, AND METHOD FOR COMMUNICATING TIRE DATA BETWEEN A VEHICLE TIRE AND A REMOTE COMPUTING DEVICE." The complete disclosure of this prior publication is incorporated herein by reference.

The term "self-generating" means generated or originating through its own activity, and without requiring the use of an electrical power supply external to the present data communications device, wheel hub assembly or vehicle.

The term "independently influenced" means capable of moving substantially freely relative to adjacent structure, such that movement is not substantially influenced by the movement of the adjacent structure.

According to another exemplary embodiment, an electronic non-volatile data storage medium is located within the housing, and is operatively connected to the microprocessor.

According to another exemplary embodiment, the components carrier is freely mounted on a central axis affixed to the housing.

According to another exemplary embodiment, an alignment weight is attached to the components carrier, and is adapted to gravitationally hold said components carrier substantially stationary during rotation of the housing.

According to another exemplary embodiment, the components carrier comprises a printed circuit board.

According to another exemplary embodiment, the energy storage and supply medium comprises a battery.

According to another exemplary embodiment, the energy storage and supply medium comprises a capacitor.

According to another exemplary embodiment, an radio frequency identification (RFID) tag is affixed to the housing, and capable of reading, writing, and storing electronic vehicle data.

According to another exemplary embodiment, a satellite tracker is operatively connected to the microprocessor, and is capable of using a Global Positioning System (GPS) to determine and track a geographic location of the vehicle data communications device.

According to another exemplary embodiment, a solar panel is mounted on the housing, and is operatively connected to the microprocessor. In one example, the microprocessors may act as a regulator for solar panels up to 80 watts.

According to another exemplary embodiment, a vehicle marker light is carried by (or attached directly or indirectly to) the housing, and is operatively connected to the microprocessor.

According to another exemplary embodiment, a tire inflation system carried by (or attached directly or indirectly to) the housing, and is operatively connected to the microprocessor.

According to another exemplary embodiment, a tire temperature measuring device carried by (or attached directly or indirectly to) the housing, and is operatively connected to the microprocessor.

According to another exemplary embodiment, a camera is carried by (or attached directly or indirectly to) the housing, and is operatively connected to the microprocessor.

According to another exemplary embodiment, the housing defines a sight window designed to enable visual inspection of the vehicle's axle hub oil level.

According to another exemplary embodiment, the signal transmitting device comprises a transceiver.

According to another exemplary embodiment, the signal receiving device comprises a transceiver.

According to another exemplary embodiment, the transceiver wirelessly transmits and receives data via a wireless communications technology selected from a group consisting of radio frequency (RF), Bluetooth, WI-FI, cellular, satellite, Low Power Wide Area Network (LPWAN) protocol, Message Queue Telemetry Transport (MQTT) protocol, Near-Field Communication (NFC), and Dedicated Short Range Communication (DSRC).

In another exemplary embodiment, the present disclosure comprises a vehicle wheel hub assembly incorporating a wireless vehicle data communications device with a self-generating electrical power supply.

In yet another exemplary embodiment, the present disclosure comprises a method for generating electrical power in a vehicle data communications device mounted on a wheel hub assembly of a vehicle. The method includes rotating a housing of the vehicle data communications device simultaneously with the wheel hub assembly when the vehicle is in motion. Using a signal transmitting device operatively connected to a microprocessor within the housing, data is wirelessly transmitted from the vehicle data communications device to a remote computer. Using a signal receiving device operatively connected to a microprocessor within the housing, data is wirelessly received from a remote computer. A magnetic field is automatically generated during rotation of the housing, thereby inducing electric current. The electric current generated during rotation of the housing is received and stored. The stored electric current is then used to supply electrical power to components of the vehicle data communications device.

In alternative embodiments, the housing of the vehicle data communications device may comprise one or more USB ports adapted for connecting other various electronic accessories to the vehicle data communications device. The housing may also have a transparent viewing port or window through which a technician could easily check oil level. Additionally, the exemplary housing may comprise a low-profile design, and may function as a replacement hubcap within increased surface area contact for fastening.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Referring now specifically to the drawings, a wireless vehicle data communications device according to one exemplary embodiment of the present disclosure is illustrated in FIGS. 1-6, and shown generally at broad reference numeral 10. The exemplary device 10 is adapted for mounting on a wheel hub assembly 11 of a vehicle, and incorporates a self-generating electrical power supply described further below. While the exemplary device 10 is especially applicable for use in the heavy-duty trucking industry, the concept of the present disclosure may be incorporated in any other vehicle or equipment having one or more accessible rotating components. Such vehicles and equipment may include, for example, passenger cars, sport utility vehicles, all-terrain vehicles, light trucks, off-road equipment, trains, rail cars, aircraft, watercraft, golf carts, cycles, scooters, turbines, and other rotating devices that may benefit from the addition of tracking, monitoring, or communication capabilities.

Figure 1:
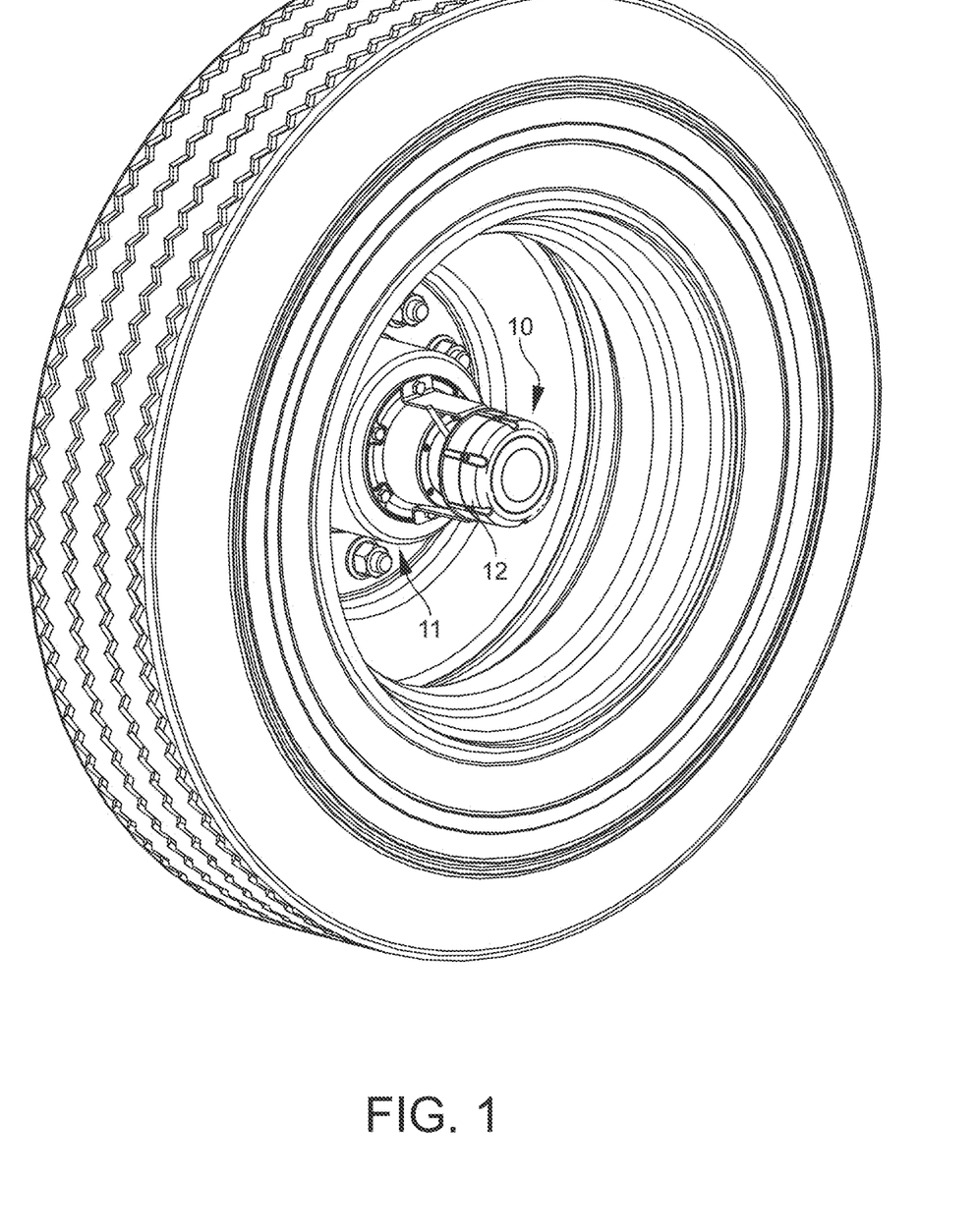
FIG. 1 is a perspective view of an exemplary vehicle data communications device mounted on the wheel hub assembly of a vehicle.
Figure 2:
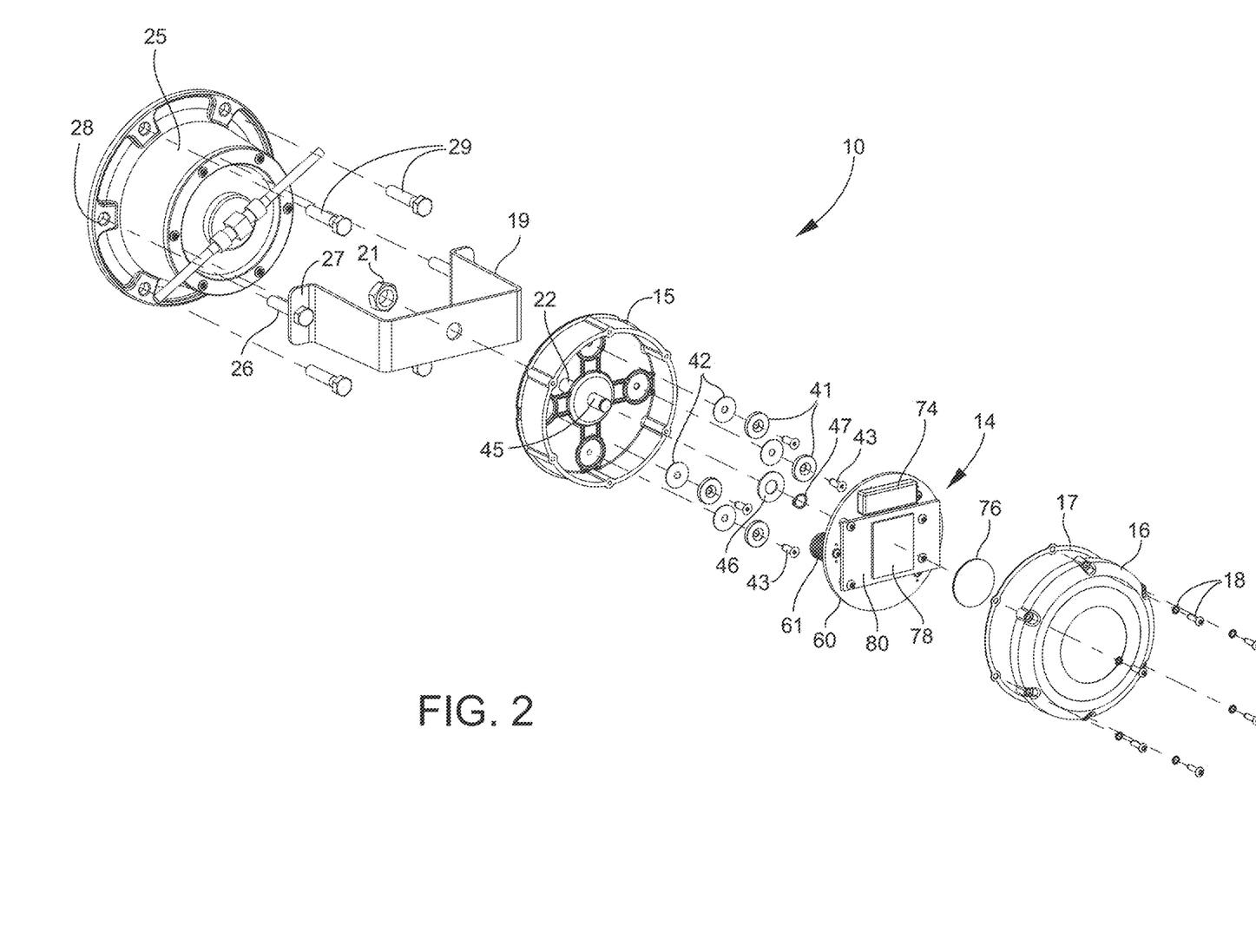
FIGS. 2, 3, and 4 are exploded views of the exemplary device illustrated in FIG. 1.

As best shown in FIGS. 1 and 2, the exemplary vehicle data communications device 10 comprises a sealable housing assembly 12 containing a PCB subassembly 14 and various components of the self-generating electrical power supply described below. In one embodiment, the housing assembly 12 includes a hollow cylindrical body 15, a removable end cap 16, and gasket 17 assembled using hardware 18. The body 15 of housing 12 assembly is centrally mounted on a generally U-shaped metal pedestal bracket 19 using suitable hardware 21, 22, and is affixed to the vehicle (e.g., at hub seal 25) by threaded fasteners 26 passing through respective feet 27 of the bracket 19, through aligned peripheral openings 28 of the hub seal 25, and into complementary threaded openings of the wheel hub assembly 11. The hub seal 25 may be further secured to the hub assembly 11 by additional fasteners 29. The cylindrical body 15 of the housing assembly 12 contains a plurality of strategically arranged permanent (e.g., neodymium) magnets 41 attached to the floor of the cylindrical body 15 by respective adhesive disks 42 and fasteners 43. A fixed centrally-aligned housing shaft 45 projects from the floor of the body 15, receives washer 46 and retaining ring 47, and is designed to mate with a complementary sleeve bearing 51 located on bearing bracket 52 shown in FIGS. 3 and 4. The bearing bracket 52 is mounted by fasteners 55 to the inside (or wheel side) of a components carrier 60 of the PCB subassembly 14. The exemplary components carrier 60 may comprise a printed circuit board. The inside of components carrier 60 further comprises strategically arranged copper wire coils 61 attached by fasteners 62 and located to operatively align with the permanent magnets 41 attached at the floor of the body 15. The components carrier 60 is freely mounted to the fixed housing shaft 45 at sleeve bearing 51, and is independently influenced (movable) relative to the housing assembly 12 such that the components carrier 60 and its attached coils 61 remain substantially stationary during rotation of the magnets 41 and housing assembly 12.

Figures 3, 4:
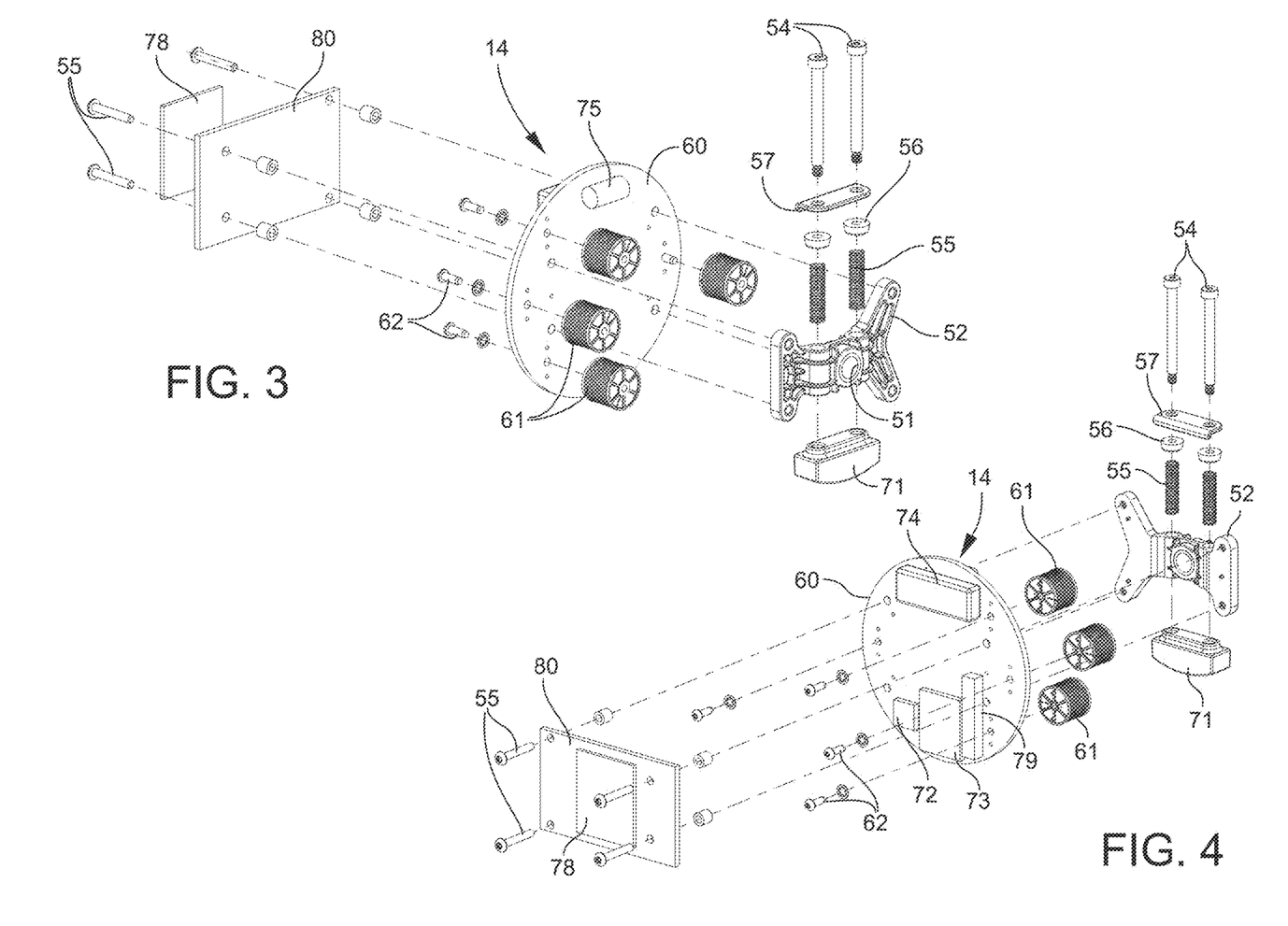
Figure 5:
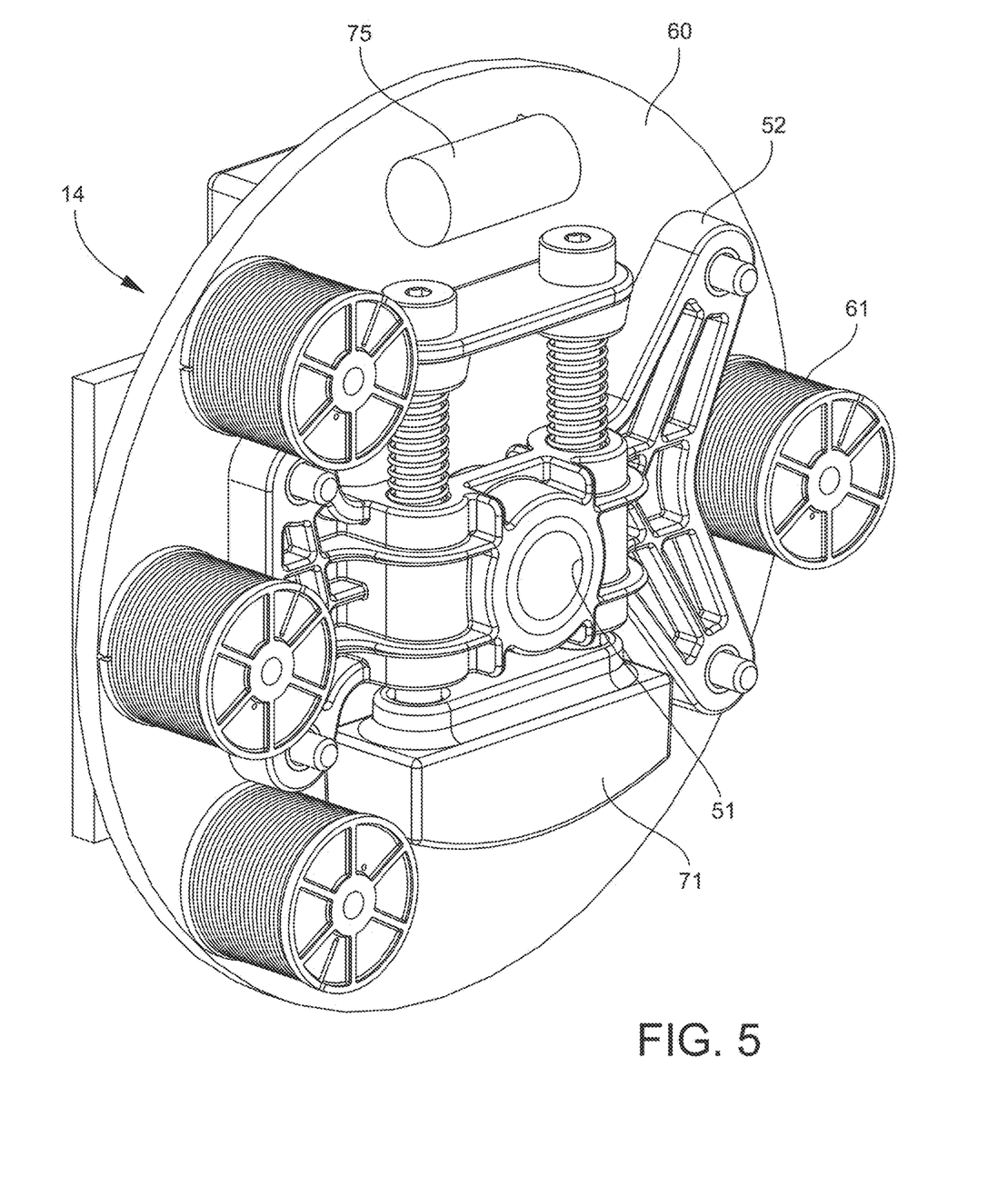
FIG. 5 is a perspective view of the assembled PCB subassembly in the exemplary embodiment of FIG. 1.

Referring to FIGS. 3, 4, and 5, the exemplary components carrier 60 is gravitationally oriented and held stationary using a spring-biased counterweight 71 attached to the bearing bracket 52 by threaded screws 54, and including shock-absorbing springs 55 and bumpers 56, and spring bracket 57. The carrier 60 may further comprise various electronic components and circuitry of the PCB subassembly 14 including a low power embedded programmable microprocessor 72 (or microcontroller), non-volatile flash memory 73, a rechargeable battery 74 and capacitor 75. The flash memory 73, battery 74, and capacitor 75 are operatively connected to (or communicate with) the microprocessor 72 in a manner known and understood in the art.

Additionally, an RFID tag 76 may be affixed to outside the housing assembly 12. The RFID (e.g., NFC) tag 76 may comprise unique device ID and maintenance information specific to the associated vehicle data communications device, as well as other technical and non-technical information. For example, the RFID tag can be programmed with wireless connection information for pairing, a URL link to user instructions or company information, and relevant Vehicle Maintenance and Reporting Standards (VMRS) codes. By holding an NFC capable device (such as a smartphone or tablet) near the RFID tag, this programmed data can be read and acted upon.

In the exemplary device 10, the housing assembly 12 rotates simultaneously with the wheel hub assembly 11 during normal operation of the vehicle. As the housing assembly 12 rotates, the permanent magnets 41 located at the floor of cylindrical body 15 repeatedly travel past the wire coils 61 attached to the stationary asymmetrically-weighted components carrier 60, thereby generating a magnetic field and inducing electric current—through electromagnetic induction. The resulting alternating current (AC) voltage is input into a charging circuit which feeds the battery 74 (and/or capacitor 75), which then supplies power to the microprocessor 72 and other electronic components operatively connected to or communication with the PCB subassembly, including solar panel 78, transceiver 79, and GPS tracker/module 80. As shown in the block diagram of FIG. 6, the microprocessor 72 may operatively connect to (or communicate with) various electronic components mounted on, connected to, or communicating with the PCB subassembly 14. Such other electronic components may include, for example, an operator display or LED status alert 81, tire inflation system 82, tire temperature measuring device 83, tire pressure monitoring system 84, marking light 85, video camera 86, vehicle weight sensor 87, vehicle speed sensor 88, wireless receiver 89, and other vehicle sensors 90 operatively connected to or communicating with the battery 74 and/or capacitor 75. The additional receiver 89 may be used to wirelessly receive signals from a TPMS sensor in challenging radio conditions. TPMS sensors communicate at 433 MHz for commercial vehicles, and at 315 MHz for passenger cars and light trucks.

The temperature measuring device 83 can be used to detect when bearings are failing based upon the detection of frictional heat produced at the failing component. This temperature alert data can then be stored in non-volatile memory 73 for immediate or later transmission. Additionally, the exemplary device 10 can locally communicate temperature events such as bearing failure through means such as a LED readout/display, indicator light, buzzer, or other alert so that inspectors are readily notified that a potential problem exists.

Figure 6:
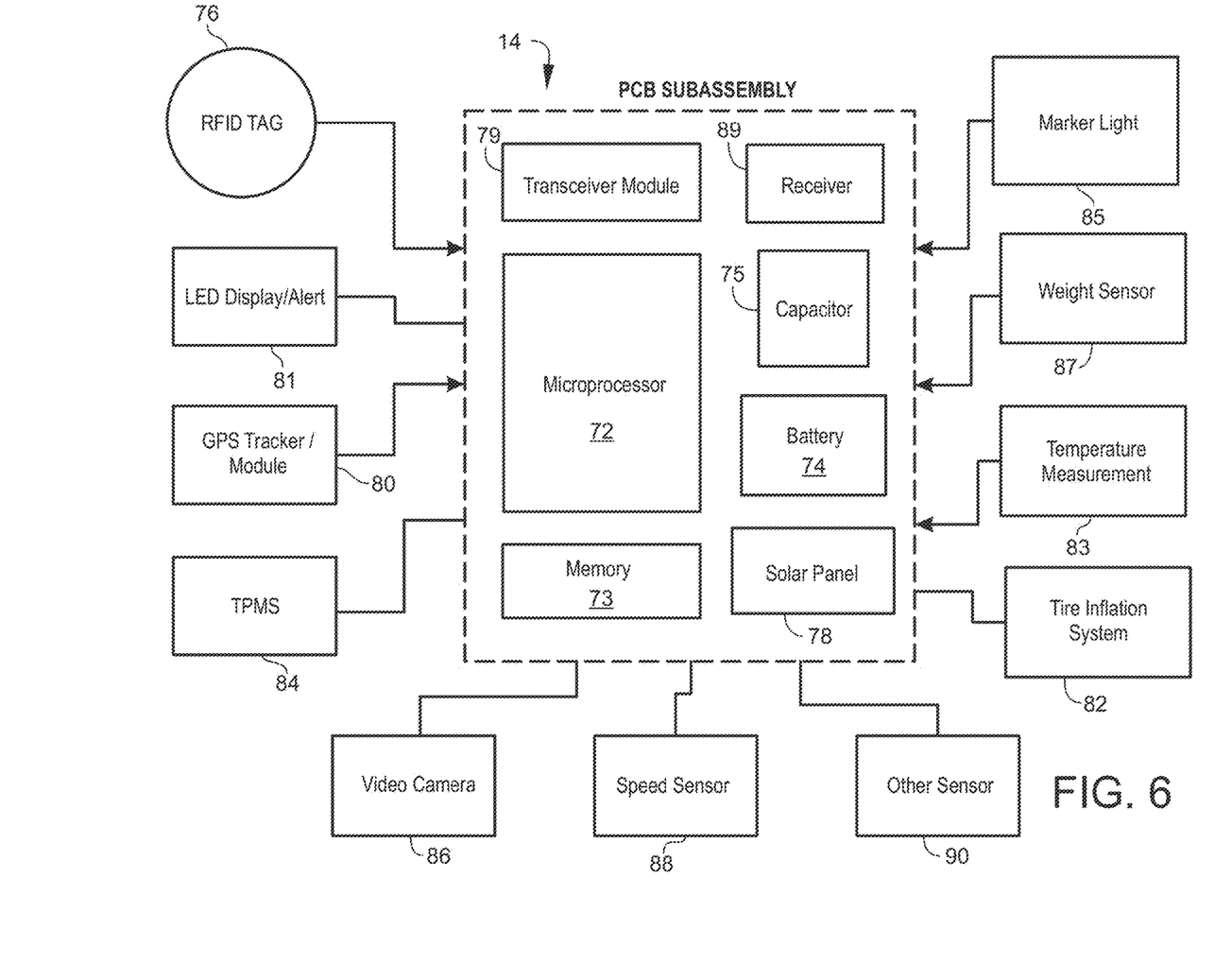
FIG. 6 is a block diagram illustrating various components and accessories associated with the exemplary vehicle data communications device.

Referring again to the block diagram of FIG. 6, the microprocessor may further operatively connect to (or communicate with) various wireless components referred to broadly and generically in the drawings as transceiver 79—or alternatively, transmitting device, receiving device, and/or transmitter-receiver. Exemplary wireless components may comprise a wireless transmitter, a wireless receiver, and wireless transceivers (e.g, RF, WI-FI, Bluetooth, cellular)—each of which may be mounted on, connected to, or communicating with the PCB subassembly 14. Other wireless components may include, for example, a 125 KHz LFID transmitter, 433 MHz receiver, 433 MHz transceiver, 13 MHz RFID (tag reader/rewriter) transceiver, 315/433-434 MHz RF transmitter, Bluetooth module, WI-FI module, integrated cellular transceiver, satellite data transceiver, and respective antennas. The wireless components may utilize any one or more of various wireless communications technologies for the transmission of data to and from the vehicle, and between the vehicle and a remote computer. Such wireless communications technologies include, for example, radio frequency (RF), Bluetooth, WI-FI, cellular, satellite, Low Power Wide Area Network (LPWAN) protocol, Near-Field Communication (NFC), Dedicated Short Range Communication (DSRC), and Real Time Protocol/User Datagram Protocol/Internet Protocol (RTP/UDP).

In one exemplary embodiment, the present vehicle data communications device 10 wirelessly transmits and receives data using Message Queue Telemetry Transport (MQTT), a protocol governed by the ISO/IEC PRF 20922 standard. MQTT has been described as a Client Server publish/subscribe messaging transport protocol. It is light weight, open, simple, and designed so as to be easy to implement. These characteristics make it ideal for use in many situations, including constrained environments such as for communication in Machine-to-Machine (M2M) and Internet-of-Things (IoT) contexts where a small code footprint is required and/or network bandwidth is at a premium. This protocol is typically used over Transmission Control Protocol/Internet Protocol (TCP/IP) networks to transfer small amounts of information while consuming little power. By using this protocol, the exemplary vehicle data communications device can wirelessly transmit collected vehicle and sensor data through a "broker" to be wirelessly received by any number of subscribing devices.

Figure 7:
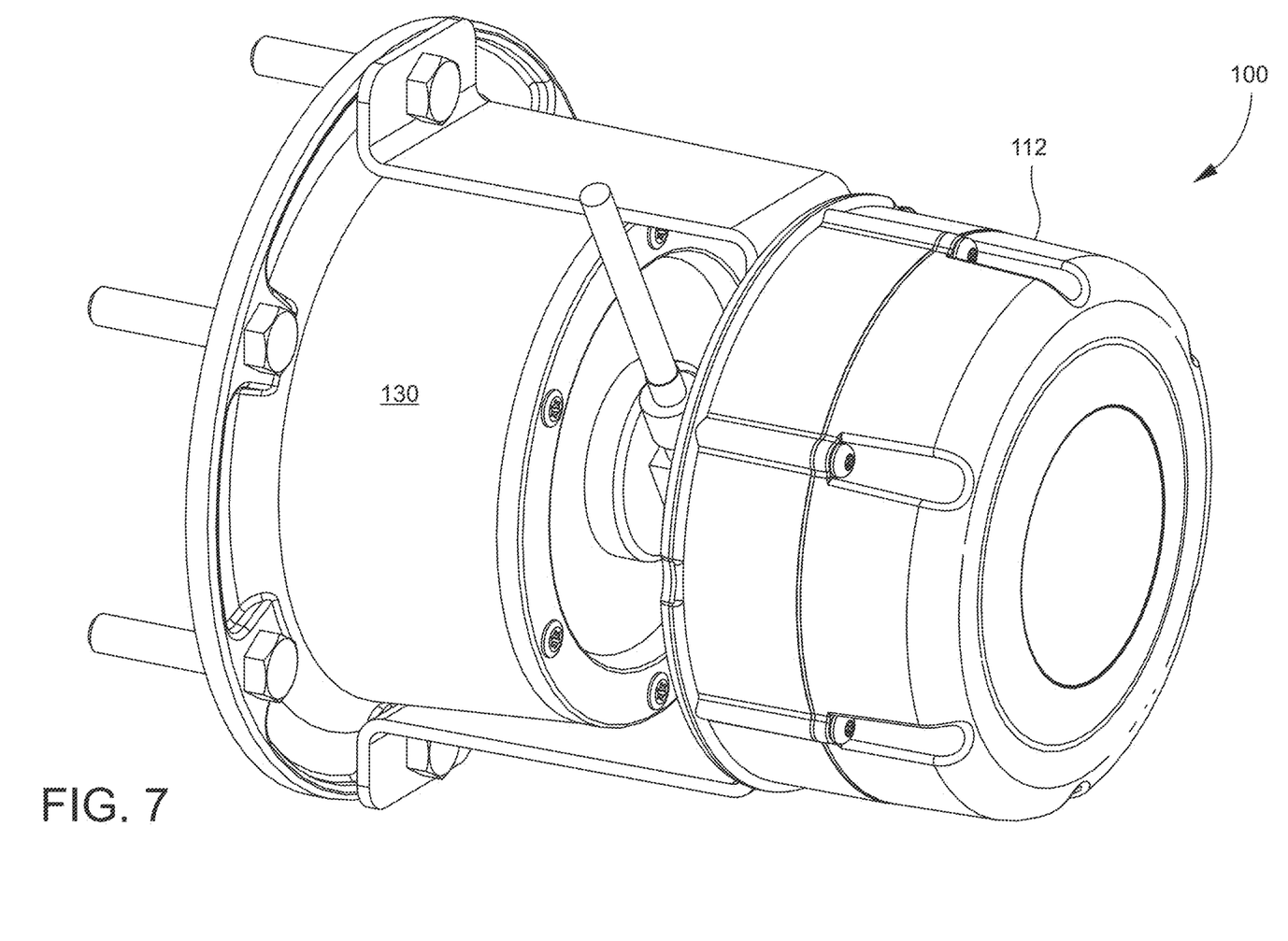
FIG. 7 is a perspective view of a further exemplary vehicle data communications device mounted on the wheel hub assembly of a vehicle.
Figure 8:
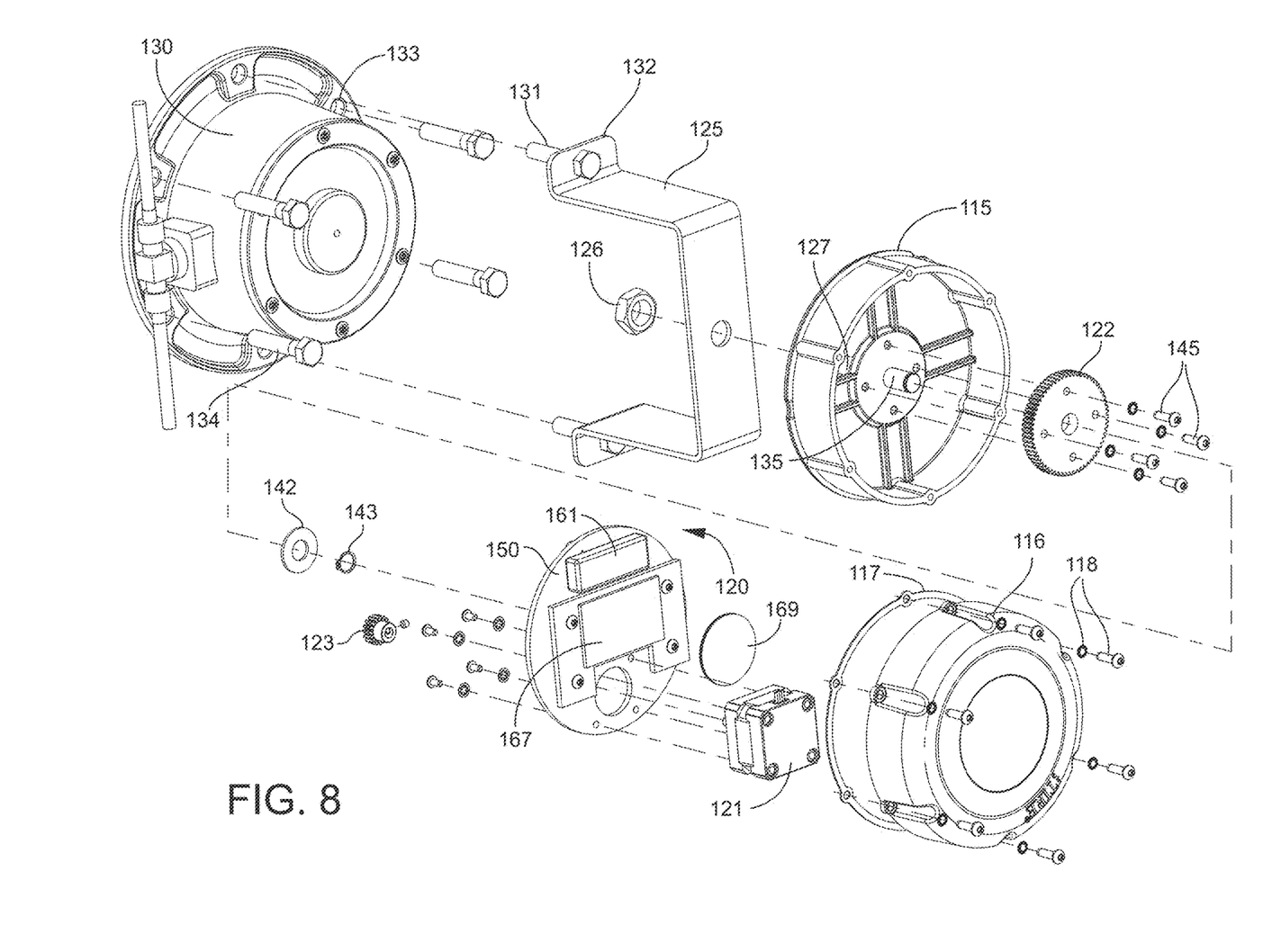
FIGS. 8, 9, and 10 are exploded views of the exemplary device illustrated in FIG. 7.

A further exemplary embodiment of the present vehicle data communications device 100 is illustrated in FIGS. 7-12. Referring to FIGS. 7 and 8, the exemplary device 100 is mounted on a wheel hub assembly (such as shown in FIG. 1), and comprises a sealable housing assembly 112 including a cylindrical body 115, end cap 116, and gasket 117 assembled by hardware 118. The housing assembly 112 contains a PCB subassembly 120, an electric stepper motor 121, and a gear assembly comprising cooperating large and small drive gears 122 and 123. The electric motor 121 and gear assembly function, as described below, to provide a self-generating electrical power supply to components of the PCB subassembly 120. The cylindrical body 115 of housing assembly 112 is centrally mounted on a generally U-shaped metal pedestal bracket 125 using suitable hardware 126, 127, and is affixed to the vehicle (e.g., at hub seal 130) by threaded fasteners 131 passing through respective feet 132 of the bracket 125, through aligned peripheral openings 133 of the hub seal 130, and into complementary threaded openings of the wheel hub assembly. The hub seal 130 may be further secured to the hub assembly 130 by additional fasteners 134. A fixed centrally-aligned housing shaft 135 projects from the floor of the cylindrical body 115, and receives the large-diameter nylon drive gear 122, washer 142, and retaining ring 143. The drive gear 122 is affixed to a floor of the housing body 115 by fasteners 145. The fixed housing shaft 135 extends through the drive gear 122 and mates with a complementary sleeve bearing 148 (FIG. 9) located on bearing bracket 149 and mounted on an inside or wheel side of a components carrier 150 of the PCB subassembly 120.

Figure 9:
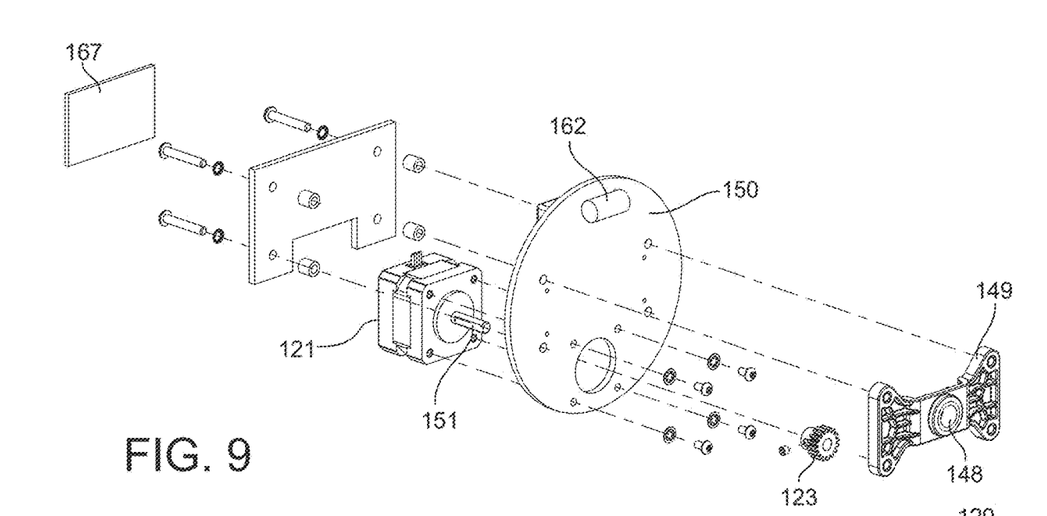
Figure 10:
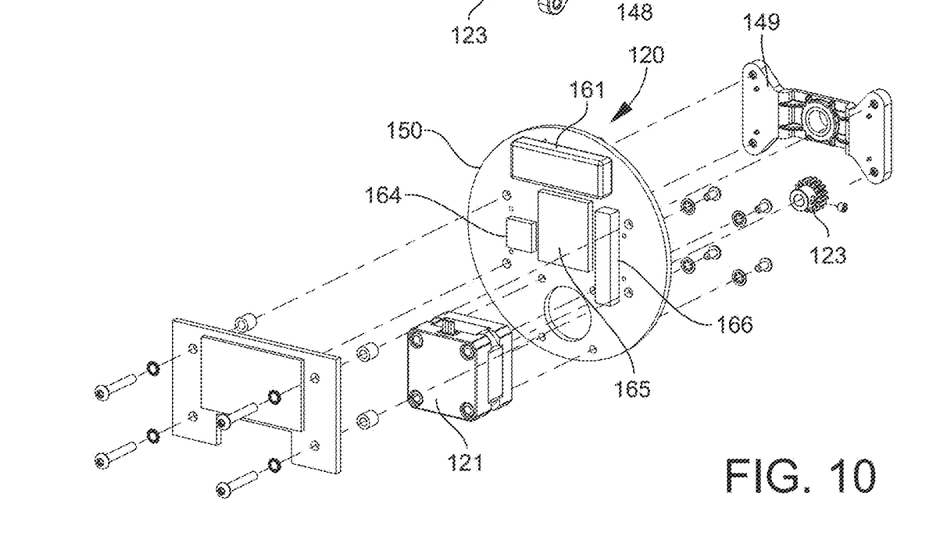
Figure 11:
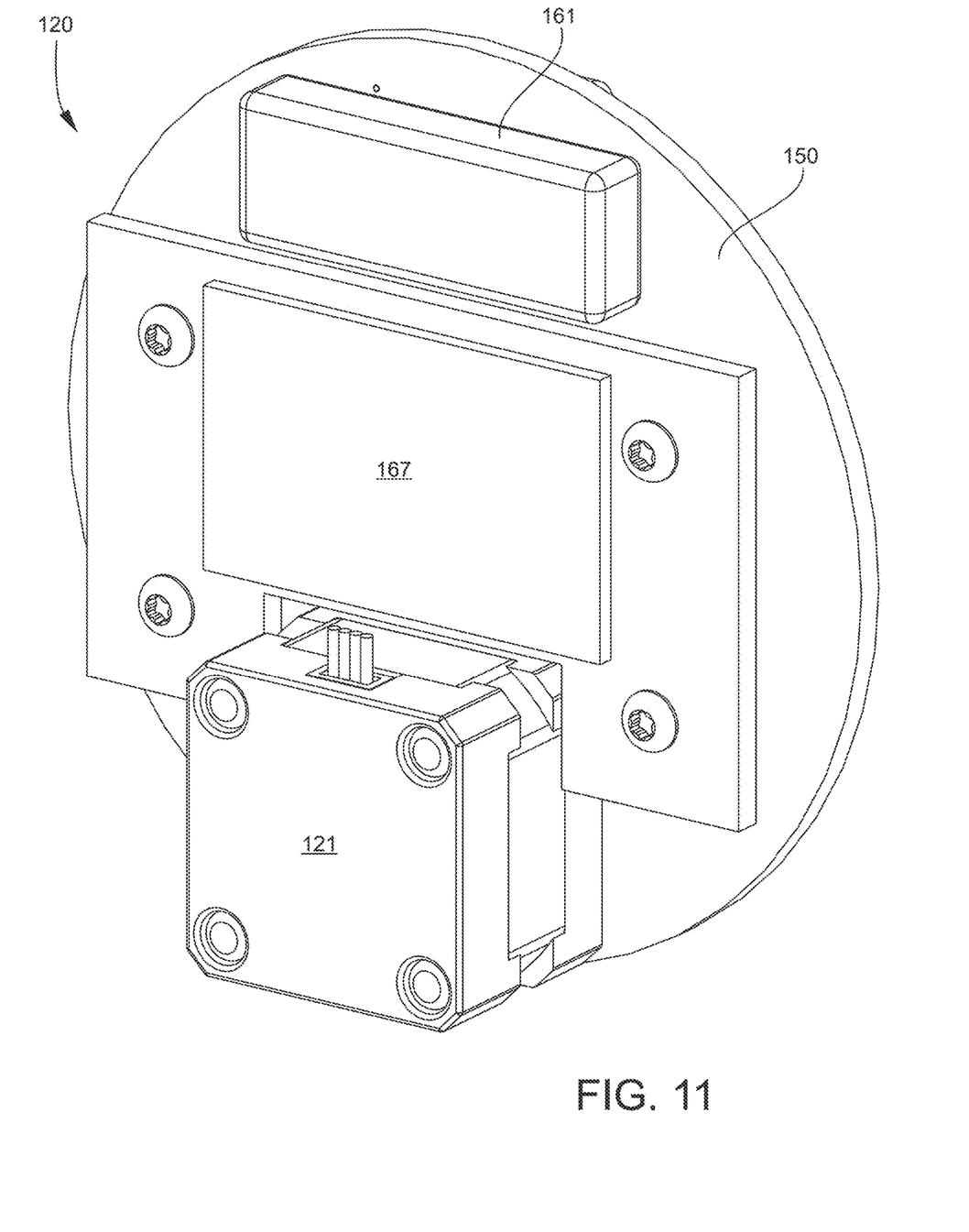
FIGS. 11 and 12 perspective views of the assembled PCB subassembly in the exemplary embodiment of FIG. 7.
Figure 12:
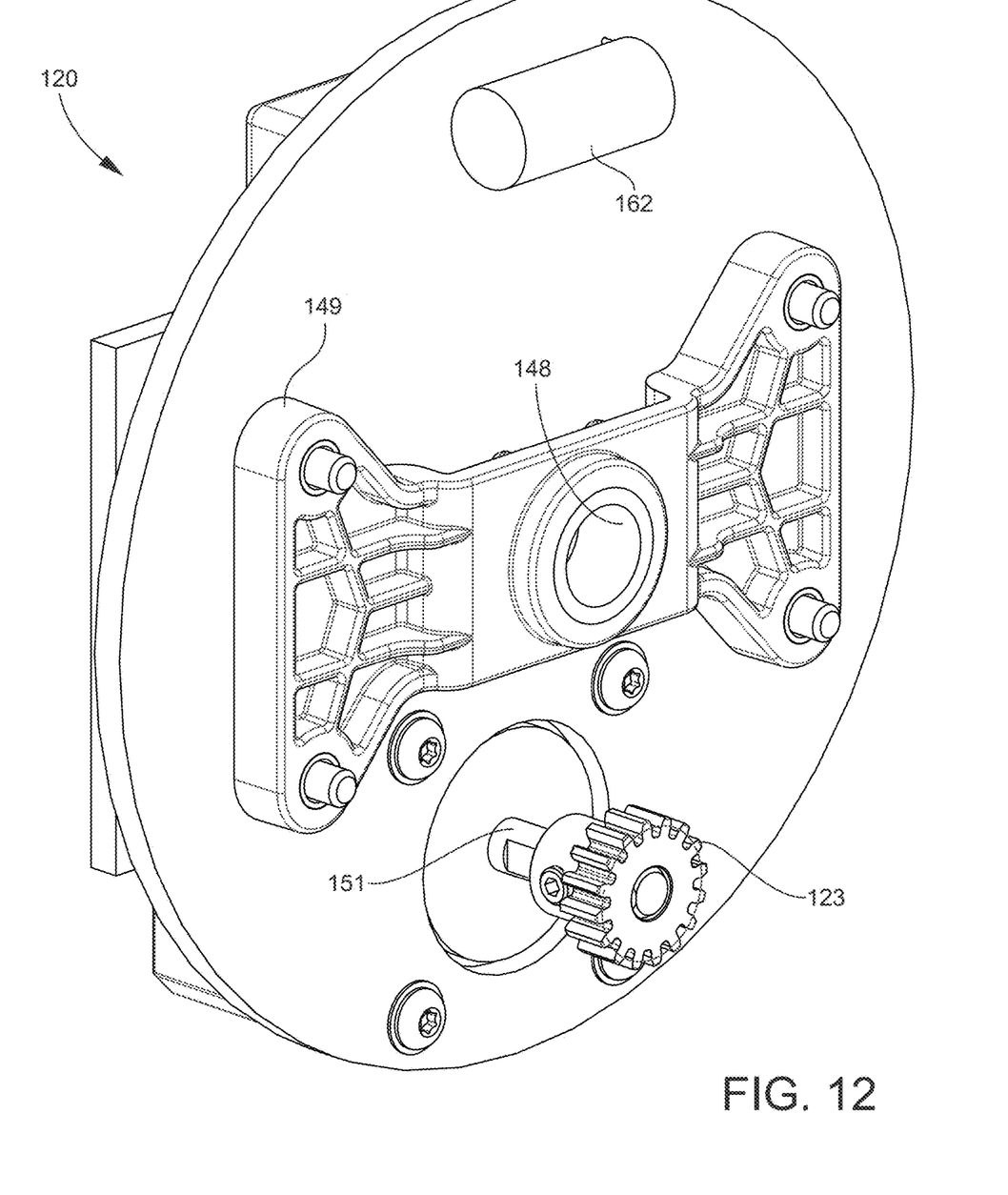

As best shown in FIGS. 9 and 10, the electric motor 121 is asymmetrically mounted to an outside of the components carrier 150, and has an elongated rotor 151 which extends through the carrier 150 to the small-diameter nylon drive gear 123 (See FIG. 12). The small drive gear 123 connects to the rotor 151, and operatively meshes with the large drive gear 122. The components carrier 150 is freely mounted to the fixed housing shaft 135 at sleeve bearing 148, and is independently influenced (movable) relative to the housing assembly 112 such that the components carrier 150 and electric motor 121 remain substantially stationary during rotation of housing assembly 112.

When the housing assembly 112 rotates, the weight of the electric motor 121 at the bottom of the carrier 150 allows it to substantially maintain angular equilibrium with respect to the road surface during movement of the vehicle. The relative motion between the housing assembly 112 and the carrier 150 actuates the large and small drive gears 122, 123, thereby causing the rotor 151 of the electric motor 121 to reverse rotate relative to the body of the motor. In the interior of the motor 121, magnets are driven past coils and a voltage is produced. This electrical energy is then output to the PCB subassembly 120 where it is used to charge one or more energy storage devices, such as battery 161 and capacitor 162. The exemplary PCB subassembly 120 may further comprise a low power embedded programmable microprocessor 164 (or microcontroller), non-volatile flash memory 165, transceiver 166, and solar panel 167, as incorporated in the device 10 described above. The battery 161, capacitor 162, flash memory 165, and transceiver 166 are operatively connected to (or communicate with) the microprocessor 165 in a manner known and understood in the art. Additionally, an RFID tag 169 may be mounted on the housing assembly 112.

In the exemplary device 100, the sizing of the large and small gears 122, 123 determines the relationship between the housing assembly 112 rotation and the rotor shaft 151 rotation. For vehicles used in primarily low speed environments, a larger housing mounted gear ratio may be desired to drive the rotor shaft at adequate speeds to power the electronics. To protect the device 100 from damage resulting from a speeds above an anticipated threshold, a clutch may be added to disengage the gears 122, 123 from one another. This clutch could also activate when the device is fully charged in order to limit component wear due to friction. Although the exemplary device 100 incorporates a stepper motor 121, other varieties of electric motors could be utilized for this electrical generation method.

In each of the exemplary embodiments described above, vehicle and other data may be wireless transmitted to and from the vehicle data communications device 10, 100, and between the exemplary communications device 10, 100 and a remote computer. Several exemplary applications of the present device 10, 100 are described further below. In each of these examples, the remote computer may incorporate or comprise any general or specific purpose machine with processing logic capable of manipulating data according to a set of program instructions. For example, the remote computer may comprise a mobile computing device, such as a laptop computer, netbook, e-reader, tablet computer, mobile phone, smartphone, personal digital assistant, desktop, and others. Alternatively, the remote computer may comprise an electronic onboard recorder (EOBR), vehicle telematics, or other vehicle computing systems. The remote computer may also comprise a cloud server, dedicated server or physical server. In one example, the vehicle data communications device 10, 100 may wirelessly communicate directly with vehicle electronics and subsystems via data buses [SAE J1708/1587, 1939, 2497 (PLC), 1850 and CAN].

The vehicle data communications device 10, 100 may store all or part of its collected data in non-volatile flash memory, or may transmit all or part of this data to the remote computer. In one example, the vehicle data communications device 10, 100 wireless transmits data to the vehicle's telematics (information and communications technology, or ITC), or EOBR, or sealed splice pack system (e.g., VES-PAC™ inline circuit fuse holder), or other vehicle-mounted or integrated computing/communications unit. The collected vehicle data may then be stored and/or transferred using vehicle telematics via satellite or cellular network to a remote terminal, such as physical server, cloud storage, or corporate office workstation. Data may also be wirelessly transmitted to the vehicle communications device 10, 100 for reprogramming and updating.

EXEMPLARY IMPLEMENTATIONS (a) GPS/Location Information

Utilizing GPS technology, the exemplary vehicle data communications device 10, 100 (or "hub mounted device" or simply, "device") may be utilized to estimate tire tread depth. The location information of an outfitted vehicle can also be determined with the inclusion of a GPS or GLO-NASS antenna. Using a location record for the vehicle, it would be possible to determine the distance the vehicle has traveled. By measuring the frequency of electrical impulses caused by the passage of magnets past the coils used for generating (harvesting) energy, the number of rotations of the wheel assembly can be ascertained. Combined with GPS-determined mileage data, an indirect measurement of tire tread depth can be established based upon the equations below where r is the tire radius and $r_0$ is the original tire radius.

$$r = \frac{mileage}{2\pi * (\# \text{ of Rotations})} \quad \text{tread loss} = r_0 - r$$

Any sudden change in this indirect measurement of the tire radius could be assumed to be a result of a significant loss of tire pressure (such as in the case of a blowout), and the operator could be notified through the hub mounted device's wireless communications capabilities.

(b) Tire Pressure Management System (TPMS)

In another exemplary application, the present vehicle data communications device 10, 100 may be employed to monitor tire pressure—ensuring that tires are inflated at correct PSI and also detect leaking tires. For example, a tire with a 25" diameter @ 100 PSI would have 520 R/M (revolutions per mile). The same diameter tire that has lost air due to a leak, may show a PSI reading of 80 and an RIM reading of 600. The higher the R/M, the smaller the diameter of the tire, indicating it has lost pressure. If the R/M is lower than the average reading, this could indicate that the tire has too much pressure and may also indicate a problem with the tire such as a worn or broken radial causing the tire to have a larger diameter or bulge.

The exemplary hub mounted device 10, 100 could also communicate with tire pressure monitoring systems (TPMS) either directly with individual sensors or indirectly through an intermediary device. TPMS sensors found in tires commonly transmit data using frequencies at or close to 433 MHz. By including a compatible receiver as part of the hub mounted device 10, 100, TPMS sensors in each tire could send pressure, temperature, battery level and other data that could be relayed to the driver through the vehicle's onboard computing system, or wirelessly transmitted to a back office computer (e.g., remote workstation, server or other terminal) to warn of dangerous conditions. TPMS sensors are commonly able to receive signals in the 125 kHz frequency range. By including a compatible transmitter as part of the hub mounted device 10, 100, requests could be sent to the TPMS sensors that would cause them to "wake-up" out of a low power state and transmit data back to the hub mounted device 10, 100.

(c) Tire Inflation System

In yet another exemplary application, the present vehicle data communications device 10, 100 may monitor tire pressure, and direct a tire inflation system to adjust pressure automatically as needed. Tire pressure measurement could be carried out electronically by a solid-state pressure chip and then stored in non-volatile memory for immediate or later data transmission. Additionally, the device 10, 100 could locally communicate deficient pressure states through means such as a readout/display, indicator light, buzzer, or other alert so that inspectors could easily understand that a problem is present.

In this application, a small air pump could also be incorporated into the housing design so that tire pressure could not only be measured but also corrected in the event that pressures deviated outside of an acceptable range. The pump could draw power from the reserve built up by various energy harvesting methods. Between the device 10, 100 and the hub assembly onto which it is mounted, a gap is allowed in order for tire inflation system (TIS/CTIS/ATIS) equipment to be mounted. This gap is formed by the extended length of the device's mounting bracket—as shown in FIG. 7. The tire inflation systems tie into the air-lines of the vehicle and constantly maintain the pressure of the connected tires to a preset level. This gap also leaves an avenue for technicians to visually check the oil level in the hub assembly.

(d) Tire Tread Monitoring

In yet another exemplary application, the present vehicle data communications device 10, 100 may monitor and measure tire tread depth by comparing R/M (revolutions per mile) with the average reading or by analyzing the total GPS miles driven on the tire. Higher R/M with a stable tire pressure reading can indicate that the diameter of the tire is slowly decreasing with wear. Also, the total mileage driven on a tire can indicate when it is time to replace the tire.

(e) Geo-Fencing

In yet another exemplary application, the present vehicle data communications device 10, 100 may create a virtual boundary for a trailer or equipment by using real world GPS boundaries (using either a central point with a radial distance boundary, or a set of coordinates that set a pre-defines boundary). If the trailer or equipment leaves the pre-defined boundary, the remote back office computer can be alerted or the police can be directly contacted that the trailer/equipment has been stolen and where it is located so that it can be found quickly. GPS can also be "pinged" from the back office computer so location of any trailer can be transmitted in real time. Tracking trailers and dollies can be enhanced by having two data inputs such as GPS and wheel rotation. Location, time and date stamping of equipment and cargo can be recorded and sent to the back office computer for management purposes. Geo-fencing techniques can also be used to alert management or emergency services should a truck pass outside of its allowable operating area.

This exemplary application is especially useful for rented equipment operated by non-owners. Rental equipment, such as moving vans or trailers, can be tracked and exact mileage documented by the company. For interstate equipment, fuel taxes can be broken down by state so that renter pays fuel taxes based on tax rate of state versus a pro-rated tax rate.

(f) Border Location

In yet another exemplary application, the present vehicle data communications device 10, 100 may utilize Bluetooth, Bluetooth Low Energy, GPS, and cellular data to identify the exact time and location when a trailer crosses into or out of the United States from Mexico or Canada (or any other border between countries). Homeland Security would be able to track trucks as they leave or enter the United States possibly curbing illegal activities such as drug or human trafficking. Tracking trailers and dollies can be enhanced by having two data inputs such as GPS and wheel rotation. Location, time and date stamping of equipment and cargo can be recorded and sent to the back office computer for management purposes.

The exemplary device 10, 100 may also be used to communicate authorization and cargo information via WI-FI automatically to a border crossing checkpoint to improve efficiency and record-keeping. A similar practice could be implemented on company's truck yards, so that information can be transferred to and from the vehicle as it passes through the gate when entering or leaving the yard. There are also potential uses for similarly powered devices on wheeled equipment in the off-road and railroad industries.

(g) Radar/Sonar Application

In yet another exemplary application, the present vehicle data communications device 10, 100 may use radar/sonar to relay information to the driver, via a dashboard display, of the location of the trailer in relation to other objects. For example, a truck backing a trailer into a parking space that has trailers on either side will be able to see on the dashboard display how far the trailer is from the other objects allowing the driver to back the trailer in straight. The radar/sonar can also relay information about objects located in blindspots when driving.

(h) Wireless Video Camera Power-Up

In yet another exemplary application, the present vehicle data communications device 10, 100 may be used to power a wireless 360-degree video camera mounted to the front wheel of a bus to check for people, cars or bicycles that might not be seen by the driver or the mirrors. A realtime video stream may be sent to the dashboard display so driver can check for obstacles.

(i) Other Vehicle Sensors

In yet another exemplary application, sensors could be installed at various locations on the vehicle tractor and/or trailer to communicate with the present device 10, 100. The battery of the trailer lift gate could be monitored and a warning could be given to avoid damage due to deep discharge. The doors of the trailer could be monitored and an alert be sent to the hub mounted device 10, 100 whenever the doors are opened to prevent theft. Trailer weight could be monitored and sent to the back office computer for use in route planning, or applied to properly inflate the tires of the trailer. Trailers equipped with a refrigeration system could employ sensors to monitor trailer temperature, coolant levels, and other relevant data. These and other sensors could communicate with the hub mounted device 10, 100 using wireless communications methods such as Bluetooth Low Energy (BLE), and provide additional value to the overall system.

Radar, sonar, video and other sensors could also be incorporated into the device 10, 100 in order to detect objects surrounding the vehicle. On large vehicles such as trucks and buses, objects like a bicycle or pedestrian can easily be hidden in a blind spot. Additional sensors around the vehicle can help to alert the operator to unseen danger. This could also be especially useful in parking and backing situations.

(j) Trailer Mount

In yet another exemplary application, the present vehicle data communications device 10, 100 may be used on one or more hub assemblies of a trailer. Communication between such a trailer-mounted device 10, 100 and a transceiver associated with the linked tractor's telematics system could be used to temporarily associate a linked tractor-trailer pair during a shipment. At the time of drop-off, the trailer system would be left behind and the association between the tractor-trailer pair would be severed. This could serve to automate documentation of the pick-up and drop-off of trailer borne goods in near real-time. GPS or GLONASS reception could be used to not only find the position of the device 10, 100, but also the current date and time.

(k) Bidirectional Vehicle-To-Vehicle and Vehicle-To-Infrastructure Communication By use of a wireless communications method such as Bluetooth, Wi-Fi, cellular, LoRaWAN, Dedicated Short Range Communications (DRSC), and others, the exemplary device 10, 100 could participate in bidirectional vehicle-to-vehicle and vehicle-to-infrastructure communication. Information such as the vehicle speed, heading, and acceleration could be transmitted to surrounding vehicles and stationary infrastructure. This information can be used by vehicles in proximity to avoid dangerous traffic interactions even if neither vehicle is within driver or sensor line-of-sight. The vehicle heading, speed, and acceleration can be used by infrastructure to increase the efficiency of traffic signal phase and timing, improve work zone safety, and more. Communication with infrastructure such as a fueling station could provide means of purchase authorization to the user. Furthermore, private vehicle-to-vehicle and vehicle-to-infrastructure communications could be carried out between equipment of the same fleet to transmit gathered sensor data, weather, and other types of information between vehicles and fleet-yard gates and infrastructure. Widespread weather mapping across a network of interconnected roadways could be achieved by the use of a distribution of sensor clusters on a number of trucks. These trucks are on the move frequently and could gather weather or any other type of data whose relevant sensor could be housed on the relevant type of vehicle. These vehicles would connect to each other as well as to stationary gateways through use of a Low Power Wide Area Network (LPWAN) protocol. This would allow for current and buffered historical data which had been gathered to be offloaded over LPWAN to then be analyzed in aggregate.

Additionally, by use of a wireless communication method such as Bluetooth, Wi-Fi, cellular, LoRaWAN (a Low Power Wide Area Network/LPWAN protocol), Dedicated Short Range Communications (DRSC), and others, the device 10, 100 could communicate with other systems such as the engine control unit (ECU) or a wireless adapter tied into the ECU, trailer weight sensors, transmitters on the cargo being transported, computers, phones, or tablets. By communicating with trailer weight sensors or by otherwise ascertaining the current trailer weight, the device 10, 100 could adjust the trailers tire pressure to correctly compensate for the load at each position. This adjustment could be done directly by the device 10, 100, or by issuing a command to the appropriate equipment to carry out the change. By communicating with transmitters embedded in the cargo, or with a powered gate at the trailer entrance equipped to read passive or active RF tags embedded in the cargo, the device 10, 100 could keep a manifest of cargo being loaded and unloaded from the trailer. This information could be relayed back to the back office computer via a wireless communications protocol in real time or otherwise. By communicating with a computer, phone, or tablet, the device 10, 100 could offload data such as trailer ID cargo, location record, or other information. A transmission to these device 10, 100s could also serve to pinpoint the exact location of a specific trailer on the yard to assist personnel in finding it.

In further exemplary applications, multiple vehicle data communications devices 10, 100 can be mounted on a single vehicle or vehicle combination to provide sensing and communication functionality at each wheel-end. For example, one common configuration is a three-axle tractor connected to a two-axle trailer. This configuration has ten exposed wheel-ends where a device 10, 100 could be mounted. In order to decrease operational costs, one of the ten devices 10, 100 can be designated as the "master unit", and the remaining devices 10, 100 can be designated as "slaves" whose communication would be routed through the master unit. In addition to capturing data from its own on-board sensors, the master unit is responsible for receiving remote communication from off-board sensors (pressure, temperature, acceleration/vibration, moisture, audio, proximity, cycles, pressure, imaging, weight, ABS/EBS SAE J2497, SAE J1939/J1708 data bus, door-open/close, cargo monitor, and others) as well as the slave devices using various wireless communications technology such as Bluetooth, Zigbee, WI-FI, 433 MHz, 315 MHz. Once the data has been received by the master device 10, 100, it sends periodic or event-triggered reports to the cloud via wireless communication, such as Cellular, LoRa WAN, SIGFOX, Bluetooth, and WI-FI using protocols, such as TCP/IP and MQTT. The master device 10, 100 may also be in communication with the federally mandated Electronic Logging Device (ELD) in the tractor or other interface with the telematics system.

A growing number of vehicles on the road are making use of increased axle count to better distribute their load across the road surface. For example, in Michigan a trailer with eight axles is seeing increased use and would require one master device and fifteen slave devices in order to fully outfit the vehicle. In these higher axle-count vehicles, paying for offsite communication capabilities for each device becomes increasingly cost prohibitive, and the increased efficiency of the master-slave architecture is further accentuated. In the case of axles that are located further from the cab-mounted telematics equipment, the master unit can serve to gather data from units outside of reliable communication range and relay that information to the telematics system.

Additionally, the slave devices 10, 100 in one vehicle combination must be able to accurately pair to the correct master device to avoid cross-talk. One way this can be accomplished is by the use of GPS information in each device. Slave and master devices 10, 100 gather GPS information to obtain location data. This periodically gathered data can be analyzed to find heading and speed. The slave devices would search for an available master unit with matching location speed and heading data and attempt to pair with the device. Further pairing criteria such as unique fleet ID or vehicle ID can be considered alongside the location, speed, and heading data to verify the correct master unit is found and paired to.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A wireless vehicle data communications device adapted for mounting on a wheel hub assembly of a vehicle and incorporating a self-generating electrical power supply, said vehicle data communications device comprising:
    a housing adapted to rotate simultaneously with the wheel hub assembly when the vehicle is in motion, and said housing comprising an integrally formed housing shaft and a first drive gear affixed to said housing;
    a microprocessor located inside said housing;
    a signal transmitting device operatively connected to said microprocessor, and capable of wirelessly transmitting data from said vehicle data communications device to a remote computer;
    a signal receiving device operatively connected to said microprocessor, and capable of wirelessly receiving data from a remote computer;
    an independently influenced components carrier freely arranged on said housing shaft, such that said housing is capable of rotating independent of said components carrier;
    an electric motor secured to said components carrier offset from a rotational axis defined by said housing shaft, such that said components carrier is asymmetrically weighted by said electric motor and held substantially stationary during rotation of said housing, and wherein said electric motor comprises an elongated rotor;
    a second drive gear affixed to the rotor of said electric motor and operatively meshing with said first drive gear affixed to said housing, whereby rotation of said housing when the vehicle is in motion causes simultaneous rotation of said second drive gear thereby simultaneously rotating the rotor of said electric motor and inducing an electric current;

an energy storage and supply medium operatively connected to said electric motor for storing the electric current produced by said electric motor, and for supplying electrical power to components of said vehicle data communications device.

2. The wireless vehicle data communications device according to claim 1, and comprising an electronic non-volatile data storage medium located within said housing, and operatively connected to said microprocessor.

3. The wireless vehicle data communications device according to claim 1, wherein said components carrier is freely mounted on a central axis affixed to said housing.

4. The wireless vehicle data communications device according to claim 3, and comprising an alignment weight attached to said components carrier, and adapted to gravitationally hold said components carrier substantially stationary during rotation of said housing.

5. The wireless vehicle data communications device according to claim 1, wherein said components carrier comprises a printed circuit board.

6. The wireless vehicle data communications device according to claim 1, wherein said energy storage and supply medium comprises a battery.

7. The wireless vehicle data communications device according to claim 1, wherein said energy storage and supply medium comprises a capacitor.

8. The wireless vehicle data communications device according to claim 1, and comprising an radio frequency identification (RFID) tag affixed to said housing, and capable of reading, writing, and storing electronic vehicle data.

9. The wireless vehicle data communications device according to claim 1, and comprising a satellite tracker operatively connected to said microprocessor, and capable of using a Global Positioning System to determine and track a geographic location of said vehicle data communications device.

10. The wireless vehicle data communications device according to claim 1, and comprising a solar panel mounted on said housing, and operatively connected to said microprocessor.

11. The wireless vehicle data communications device according to claim 1, and comprising a vehicle marker light carried by said housing, and operatively connected to said microprocessor.

12. The wireless vehicle data communications device according to claim 1, and comprising a tire inflation system carried by said housing, and operatively connected to said microprocessor.

13. The wireless vehicle data communications device according to claim 1, and comprising a tire temperature measuring device carried by said housing, and operatively connected to said microprocessor.

14. The wireless vehicle data communications device according to claim 1, wherein said housing defines a sight window designed to enable visual inspection of the vehicle's axle hub oil level.

15. The wireless vehicle data communications device according to claim 1, wherein said signal transmitting device comprises a transceiver.

16. The wireless vehicle data communications device according to claim 15, wherein said signal receiving device comprises a transceiver.

17. The wireless vehicle data communications device according to claim 16, wherein said transceiver wirelessly transmits and receives data via a wireless communications technology selected from a group consisting of radio frequency (RF), Bluetooth, WI-FI, cellular, satellite, Low Power Wide Area Network (LPWAN) protocol, Message Queue Telemetry Transport (MQTT) protocol, Near-Field Communication (NFC), and Dedicated Short Range Communication (DSRC).

18. A vehicle wheel hub assembly comprising a wireless vehicle data communications device and incorporating a self-generating electrical power supply, said vehicle data communications device comprising:

a housing rotating simultaneously with the wheel hub assembly when the vehicle is in motion, and wherein said housing defines a sight window designed to enable visual inspection of the vehicle's axle hub oil level;

a microprocessor located inside said housing;

a signal transmitting device operatively connected to said microprocessor, and capable of wirelessly transmitting data from said vehicle data communications device to a remote computer;

a signal receiving device operatively connected to said microprocessor, and capable of wirelessly receiving data from a remote computer;

an independently influenced components carrier freely arranged on said housing shaft, such that said housing is capable of rotating independent of said components carrier;

an electric motor secured to said components carrier offset from a rotational axis defined by said housing shaft, such that said components carrier is asymmetrically weighted by said electric motor and held substantially stationary during rotation of said housing, and wherein said electric motor comprises an elongated rotor;

a second drive gear affixed to the rotor of said electric motor and operatively meshing with said first drive gear affixed to said housing shaft, whereby rotation of said housing when the vehicle is in motion causes simultaneous rotation of said second drive gear thereby simultaneously rotating the rotor of said electric motor and inducing an electric current;

an energy storage and supply medium operatively connected to said electric motor for storing the electric current produced by said electric motor, and for supplying electrical power to components of said vehicle data communications device.

* * * * *